United States Patent [19]

Bebernes

[11] Patent Number: 5,633,452

[45] Date of Patent: May 27, 1997

[54] LOW PRESSURE WARNING FOR HYDRAULIC SYSTEM OF PLATFORM FLOAT SUSPENSION

[75] Inventor: Thomas D. Bebernes, Ottumwa, Iowa

[73] Assignee: Deere & Company, Moline, Ill.

[21] Appl. No.: 624,286

[22] Filed: Mar. 29, 1996

[51] Int. Cl.$^6$ ............................. G01M 3/00; A01D 34/28
[52] U.S. Cl. ..................... 73/37; 56/10.2 R; 56/10.2 E; 56/208
[58] Field of Search ............................. 73/37; 56/10.2 R, 56/10.2 E, 208

[56] References Cited

U.S. PATENT DOCUMENTS

| 3,597,907 | 8/1971 | Neal ............................. 56/208 |
| 3,603,066 | 9/1971 | Burrough et al. ............. 56/208 |
| 3,605,391 | 9/1971 | Schott et al. ................. 56/208 |
| 3,623,301 | 11/1971 | Höfer ........................ 56/208 X |
| 3,623,304 | 11/1971 | Molzahn ...................... 56/208 |
| 4,622,803 | 11/1986 | Lech . | |
| 5,463,854 | 11/1995 | Chmielewski, Jr. et al. ... 56/208 X |
| 5,471,825 | 12/1995 | Panoushek et al. .......... 56/10.2 E |
| 5,524,424 | 6/1996 | Halgrimson et al. .......... 56/10.2 D |

FOREIGN PATENT DOCUMENTS

| 1582154 | 4/1970 | Germany ........................ 56/208 |
| 1582161 | 4/1970 | Germany ........................ 56/208 |
| 1937346 | 2/1971 | Germany ........................ 56/208 |
| 03310 | 10/1982 | WIPO ........................... 56/208 |

OTHER PUBLICATIONS

Literature, Hesston Operator's Manual for 8400 Windrower Tractor.

*Primary Examiner*—Hezron E. Williams
*Assistant Examiner*—Daniel S. Larkin

[57] ABSTRACT

An agricultural implement includes a header or platform suspended from a main frame by a suspension permitting movement of the header between a lowered working position and a raised transport position. The suspension includes single-acting float cylinders and a single-acting lift cylinder controlled by an electrohydraulic control system including a programmable microprocessor in which a signal representative of a minimum acceptable float pressure may be set. The microprocessor contains an electronic switch that couples a warning device lead to ground to effect energization of the warning device in response to the microprocessor receiving an electronic signal representative of a float circuit pressure below the minimum acceptable float pressure. In one embodiment, the microprocessor contains a timing device which is triggered whenever a control switch is connected to energize a "lower" signal lead the timing device being set to time out when sufficient time has elapsed to ensure that the header has reached its working position. The timing device works to suppress the signal representative of the float circuit pressure so that a premature energization of the warning device does not occur when a low float pressure is due to the header being elevated from the ground. In another embodiment, a normally open mechanical switch is connected in series with the electronic switch and is closed only when the header reaches its working position. Replenishing of float pressure to a desirable level may be done either manually or automatically once the low pressure warning device has been energized.

7 Claims, 3 Drawing Sheets

5,633,452

LOW PRESSURE WARNING FOR HYDRAULIC SYSTEM OF PLATFORM FLOAT SUSPENSION

BACKGROUND OF THE INVENTION

The present invention relates to platform or header suspensions for crop harvesting implements and more specifically relates to platform suspensions using hydraulic float cylinders for carrying a majority of the weight of the platform during crop cutting operations.

Platform or header suspensions are known which utilize one or more hydraulic cylinders coupled in a closed hydraulic system so as to be in parallel with an accumulator. Float is adjusted by adding or removing oil from the system. This latter function in some systems is accomplished electrohydraulically with a rocker switch in the cab of the machine. Systems like this typically display the float system pressure on a gauge in the cab. This reference is used to monitor float pressure or to return to a float pressure setting used previously.

If the system pressure is too low, an excessive amount of platform weight is carried by the platform skid shoes or gauge wheels. This can result in premature wear on the shoes, or mechanical damage to the platform or to components linking the platform to the traction unit. Low pressure can result from internal leakage during storage periods, from intentional discharge, for example, when one platform is exchanged for another, or from unintentional discharge from inadvertent operation of the discharging switch by an operator unfamiliar with the system. Because an operator may become preoccupied with other tasks during mowing operation and not notice the pressure gauge or not know what the desired float pressure should be, a warning system is needed to let the operator know that the system is operating at an unacceptably low pressure.

SUMMARY OF THE INVENTION

According to the present invention there is provided an improved hydraulic float suspension system for the platform or header of a crop harvesting implement and more specifically there is provided a warning system for apprising the operator of an unacceptably low hydraulic pressure in the float suspension system.

An object of the invention is to provide a simple, reliable warning system for apprising an operator of an unacceptably low hydraulic pressure in an implement platform or header float suspension system.

A more specific object of the invention is to suspend a platform or header with a hydraulic float suspension system that embodies a pressure monitoring system that acts to actuate an audible warning device when an unacceptably low float pressure has existed in the system for period of time inconsistent with normal operation.

Yet a more specific object of the invention is to provide a pressure monitoring system of the type described in the immediately preceding object which includes a microprocessor which receives signals reflective of a minimum float pressure, the actual float pressure and of the fact that the header "lower" valve has been actuated, the microprocessor acting when the actual float pressure is below said minimum float pressure and when the "lower" valve has been actuated to effect completion of an electrical circuit to an audible warning device.

Another object of the invention is to provide a pressure monitoring system which acts in response to sensing a float pressure that is below a desired minimum pressure to automatically effect the increase of the float pressure until the float pressure becomes equal to or higher than said desired minimum pressure.

These and other objects will become apparent from reading the ensuing description together with the appended drawings.

DESCRIPTION OF THE PREFERRED EMBODIMENT

Preliminarily, it should be noted that terms such as "right" and "left" are made with reference to an observer standing behind the machine and looking in the direction of forward travel. Also, various components are described as occurring in pairs while only one of the pair is shown, it to be understood that the unshown component is the same as, or a mirror image of, the one shown.

Figure 1:
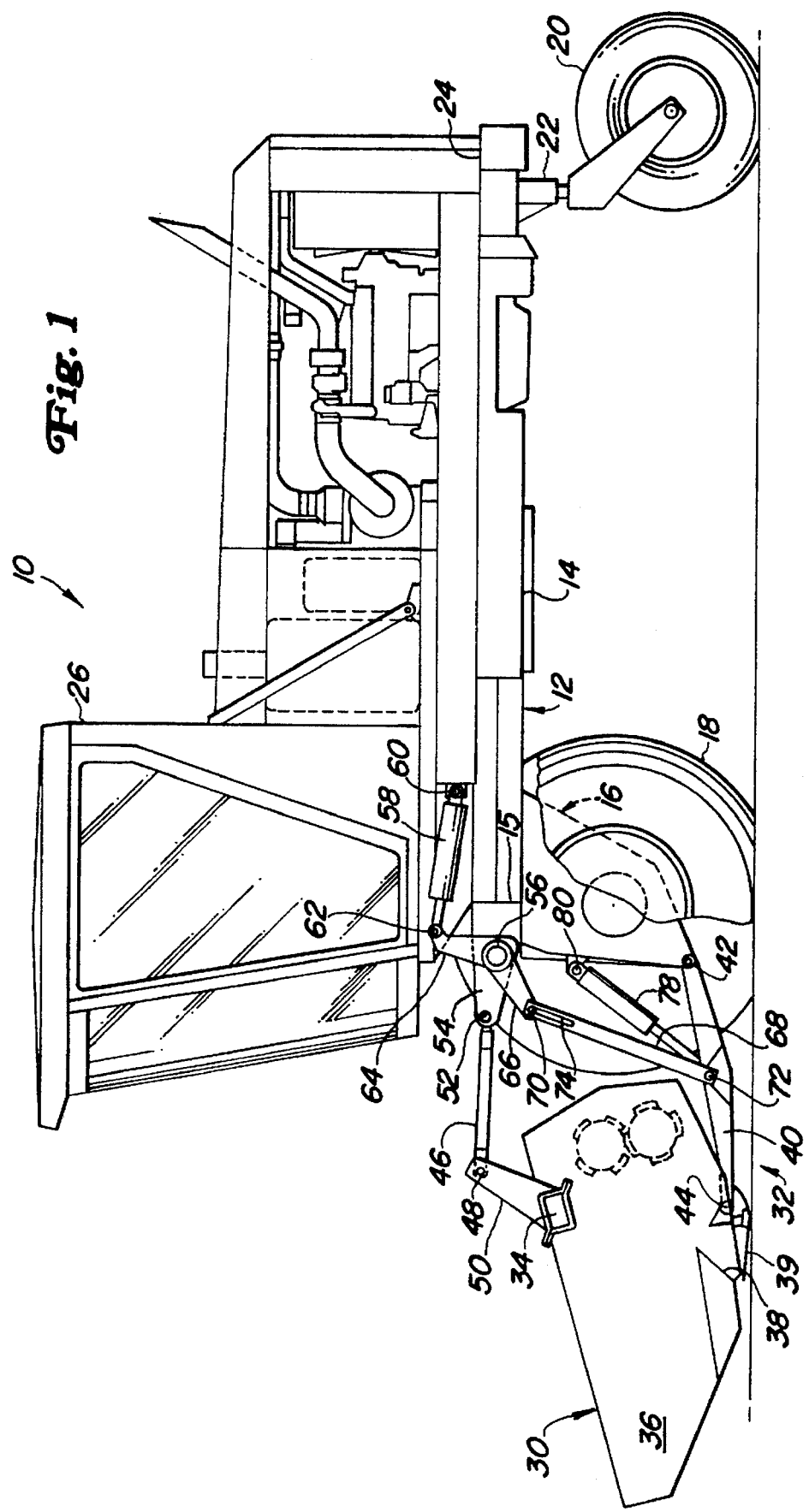
FIG. 1 is a somewhat schematic left side elevational view of a self-propelled windrower showing a hydraulic platform suspension system with which the low-pressure warning system of the present invention is particularly adapted for use.

Referring now to FIG. 1, there is shown a self-propelled windrower 10 including a main frame 12 comprising a pair of fore-and-aft extending, rearwardly converging, side beams 14 having forward portions joined together by a front cross beam 15 and being joined to right and left, downwardly extending support structures 16 to which are respectively mounted a pair of transversely spaced front drive wheels 18. A pair of rear support caster wheels 20 are mounted to opposite ends of an axle 22 mounted to a cross member 24, joining the rear of the side beams 14, for oscillating about a fore-and-aft pivot axis located centrally between opposite ends of the axle 22. Mounted to and supported above a forward end portion of the main frame 12 at a location inboard of the drive wheels 18 is an operator's cab 26 containing well-known items (not shown) such as a seat, steering wheel, and various switches and control levers for remotely controlling various functions of the windrower.

A header or platform 30 is connected, as by a suspension 32 to a forward end of the main frame 12. The header or platform 30 includes a frame defined in part by an upper rear structural member in the form of a tubular cross beam 34 extending between and having opposite ends fixed to opposite side walls 36, and in part by a cutterbar support structure 38 also extending transversely between and having opposite ends fixed to lower, middle locations of the side walls 36. A plurality of skid shoes 39 are positioned along and are fixed to the support structure 38. The suspension 32 includes a pair of parallel header lift arms 40 having their respective rear ends pivotally attached, as at 42, to lower locations of the windrower frame support structures 16, and having their respective forward ends pivotally attached, as at 44, to the cutterbar support structure 38. A central stabilizer link 46 has its forward end pivotally attached, as at 48, to the upper end of a bracket 50 projecting upwardly and slightly rearwardly from a central location along the cross beam 34 of the header frame, and has its rearward end pivotally attached, as at 52, to the forward end of a bracket 54 fixed to a central location along and projecting forwardly from the windrower main frame front cross beam 15. A rockshaft 56 extends across the front of and is pivotally mounted to the cross beam 15. A single-acting lift cylinder 58 has its cylinder end pivotally anchored, as at 60, to the windrower main frame 12 and has its rod end pivotally attached, as at 62, to an upper end of a rockshaft input arm 64 fixed to and projecting upwardly from the rockshaft 56. A pair of rockshaft output arms 66 project forwardly from and are fixed to the rockshaft 56 at respective locations placing the arms 66 in coplanar relationship to the pair of header lift arms 40. A pair of lift links 68 have respective upper ends pivotally attached, as at 70, to one of the output arms 66, and respective lower ends pivotally attached, as at 72, to a location approximately midway along the length of one of the lift arms 40. Each lift link 68 includes a slot 74 at its pivotal connection 70 which permits the lift arms 40, and hence, the header or platform 30, to float vertically when the header has been lowered for mowing operation.

Provided for counterbalancing or supporting a major portion of the weight of the header or platform 30, when the latter is in its lowered operating condition, so that only enough weight is supported by the skid shoes 39 to keep the platform on the ground are right- and left-hand suspension float cylinders 76 and 78 (see FIG. 2) having upper ends respectively pivotally attached, as at 80, to the pair of windrower frame structures 16, and having lower ends respectively pivotally attached to the header lift arms 40 by the pivotal connections 72.

Figure 2:
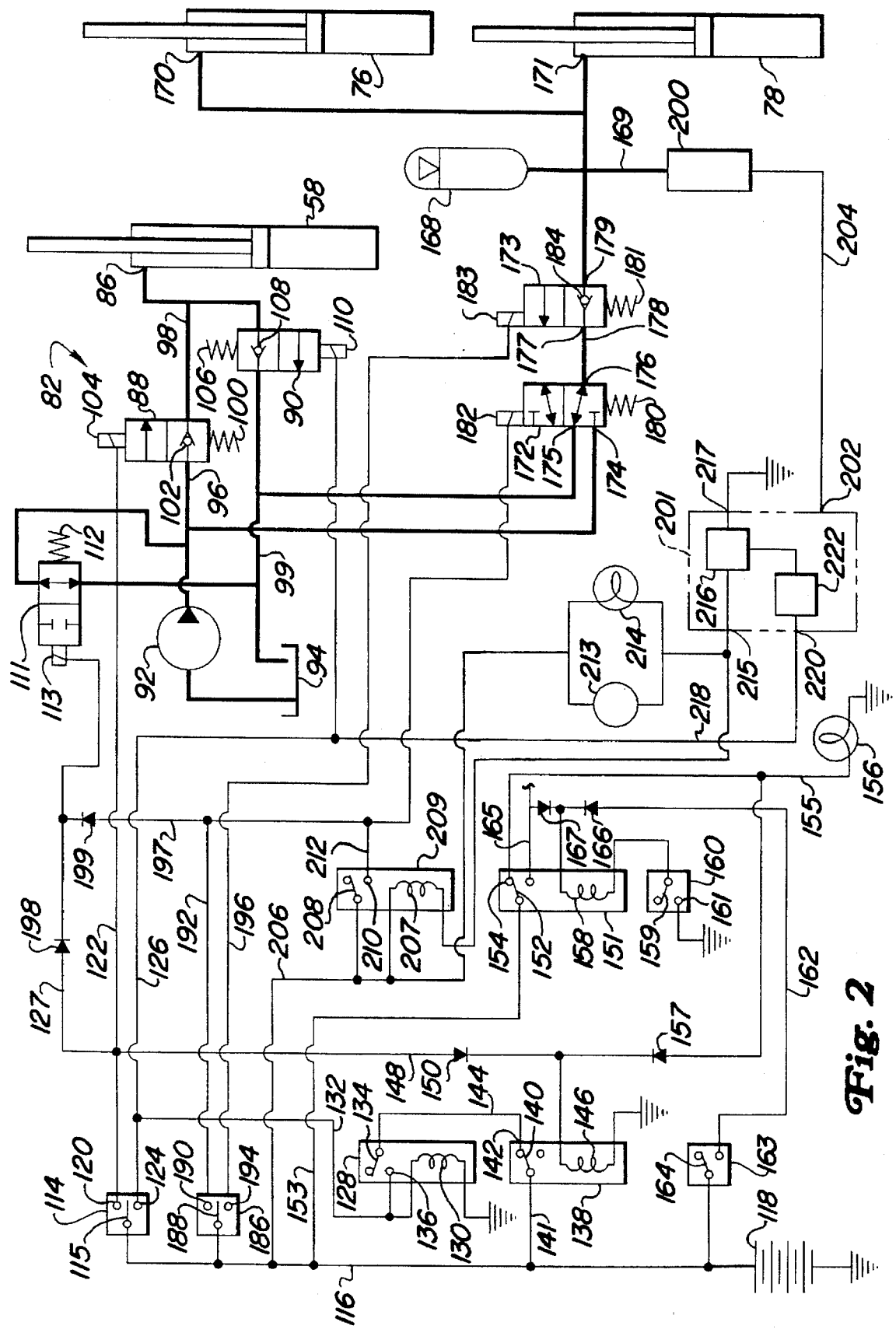
FIG. 2 is a schematic diagram of an electrohydraulic control system embodying the present invention.

Referring now to FIG. 2, there is shown an electrohydraulic control system 82 for controlling the operation of the header lift cylinder 58 and header suspension float cylinders 76 and 78 and for warning an operator of unacceptably low pressure in a float pressure circuit containing the float cylinders when the header 30 is lowered for cutting operation.

Specifically, provided for controlling the flow of pressure fluid to a rod end port 86 of the single-acting lift cylinder 58 so as to cause the cylinder to contract and lift the platform 30 is a solenoid-operated, two-position lift valve 88; and provided for controlling the exhaust of fluid from the cylinder 58 so as to permit the platform 30 to gravitate to its working position is a solenoid-operated, two-position lower valve 90. Pressure fluid is supplied by an engine-driven pump 92 having an inlet coupled to a sump 94 and an outlet coupled, as by a branched conduit 96, to an inlet port of the lift valve 88, an outlet port of the valve 88 being connected to the cylinder port 86 by a branched conduit 98. The branched conduit 98 also connects the cylinder port 86 to an inlet port of the lower valve 90, the valve 90 having an outlet port connected to the sump 94 by a branched return conduit 99. The lift valve 88 includes a spring 100 which acts to bias the valve to an "off" position wherein a check valve 102 blocks the flow of pressure fluid from the pump 92 to the lift cylinder 58, as shown. The valve 88 occupies its "off" position anytime that a solenoid 104 of the valve is de-energized, energization of the solenoid 104 causing the valve to be shifted to its "lift" position wherein it couples the pump 92 to the cylinder 58.

The lower valve 90 is somewhat similar to the lift valve 88 in that it includes a spring 106 biasing the valve to an "off" position, as shown, wherein a check valve 108 blocks the exhaust of fluid from the lift cylinder 58 to the sump 94. The lower valve 90 occupies its "off" position anytime a solenoid 110 of the valve is de-energized, energization of the solenoid 110 causing the valve to be shifted to its "lower" position wherein it couples the lift cylinder 58 to the sump 94.

When the output of the pump 92 is not required for operating any of the functions illustrated in the control circuit 82, a standby condition of the pump 92 is established wherein the output of the pump is connected to the sump 94. Specifically, a two-position, solenoid operated valve 111 has an inlet port connected to the branched supply line 96 and an outlet port connected to the branched return line 99 with the valve being biased, by a spring 112, to a normal "off" position wherein it establishes the standby condition of the pump 92 by interconnecting the inlet and outlet ports. The valve 111 includes a solenoid 113 which, when energized, shifts the valve to an "on" position where it blocks communication between its inlet and outlet ports and hence establishes a working condition of the pump.

Energization of the solenoids 104 and 110 respectively of the lift and lower valves 88 and 90 is controlled by a lift cylinder control switch 114, preferably in the form of a rocker switch, having a switching element 115 connected, as by a power lead 116, to a source of electrical power here shown as a battery 118. The switching element 114 normally occupies an "off" position, as shown, where it is centered between a "lift" contact 120 connected to the solenoid 104 of the lift valve 88 by a "lift" lead 122, and a "lower" contact 124 connected to the solenoid 110 of the lower valve 90 by a "lower" lead 126. A lead 127 is connected between the "lift" lead 122 and the solenoid 113 thereby energizing the latter to shift the valve 111 to its "on" position so as to place the pump 92 in its working condition whenever the switching element 115 of lift cylinder control switch 114 is rocked into engagement with the "lift" contact 120.

When the header 30 is lowered for mowing operation, it is necessary for the solenoid 110 of the lower valve 90 to remain energized, and hence, for the valve 90 to remain in its "lower" position so that a fluid path is established for letting fluid to escape from and enter the cylinder 58 as the header 30 moves up and down in response to the skid shoes 39 passing over undulations of the terrain. To free the operator from the need to keep the switch 114 rocked to engage the element 115 with the "lower" contact 124, a latching relay switch 128 is provided which has a relay coil 130 coupled to the "lower" lead 126 by a coil lead 132, and has a normally "off" switching element 134 which is moved to engage a "latch" contact 136 when the coil 130 is energized. The switching element 134 is connected to the power lead 116 by way of an unlatching relay switch 138 having a switching element 140 coupled, by a lead 141, to the power lead 116 and normally engaged with a power contact 142 that is connected, as by a lead 144, to the switching element 134 of the latching relay switch 128. The unlatching relay switch 138 includes a coil 146 connected to the "lift" lead 122 by a coil lead 148 containing a diode 150 for permitting current flow in the direction of the coil 146 from the "lift" lead 122. Thus, it will be seen that once the operator momentarily actuates the lift cylinder control switch 114 so as to energize the "lower" lead 126, the latching relay switch 128 will act to establish an alternate current path to the lead 126 and this path will remain completed until such time that the operator momentarily actuates the lift cylinder control switch 114 to energize the "lift" lead 122 thereby energizing the unlatching relay switch coil 146 resulting in the switching element 140 moving to its "open" position to open the circuit leading to the latching switch relay coil 130 so that the latching relay switching element 134 is released to move to its "off" position.

A safety interlock is provided for preventing the header 30 from being inadvertently lowered when the windrower 10 is traveling on a road. Specifically, a "road"/"field" condition relay switch 151 has a switching element 152 connected to the power lead 116 by a lead 153 and normally engaged with a contact 154 to which a branched lead 155 is connected. Connected in parallel with each other and to the lead 155 are a "road" condition indicator light 156 and the coil 146 of the unlatching relay switch 138, with a diode 157 being located in the lead 155 for preventing current from flowing from the lead 148 in the direction of the light 156. Thus, the safety interlock is normally in a default condition wherein the light 156 and coil 146 are energized resulting in the light being lit and the circuit through the relay switch 138 to the switching element 134 of the latching relay 128 being open. Momentary actuation of the lift control switch 114 to energize the "lower" lead 126 will only momentarily energize solenoid 110 of the "lower" valve 90 resulting in very little lowering of the platform 30. The relay switch 151 further includes a relay coil 158 having one end connected to a switching element 159 of a manually operated "road"/"field" condition selection switch 160, the switching element 159 being movable between a "road" contact 159, which opens the circuit containing the relay coil 158, and a "field" contact 161 which establishes a ground connection for the circuit containing the relay coil 158. Connected between the power lead 116 and the coil 158 for providing a source of current for energizing the coil is a "neutral" signal lead 162 containing a "neutral" switch 163 having a normally open switching element 164 that is moved to a closed position when the speed/direction control lever (not shown) for the windrower hydrostatic transmission is shifted to "neutral". Thus, energization of the coil 158 to permit normal field operation requires the switching element 159 to be moved into engagement with the "field" contact 161 and the hydrostatic transmission control lever to be placed in its "neutral" position. Energization of the coil 158 causes the switching element 152 to be moved into engagement with a contact connected to a ground speed control valve lead 165 that is connected to the coil 158 to cause it to latch the switching element 152 in place so as to ensure that the coil 158 remains energized even though the transmission control lever is moved from its "neutral" position resulting in the opening of the switch 163. Diodes 166 and 167, respectively, are provided in the leads 162 and 165 for preventing current from flowing from the lead 165 to the lead 162 and vice-versa.

A supply of fluid pressure for the float cylinders 76 and 78 is provided by a gas-over-oil accumulator 168 having its fluid reservoir coupled, as by a branched conduit 169, to rod end ports 170 and 171, respectively, of the cylinders 76 and 78, the float cylinders 76 and 78, the accumulator 168 and the branched conduit 169 cooperating to define a closed float pressure circuit. Pressure in the float pressure circuit may be adjusted in order to enhance float characteristics for different crop or terrain conditions, for headers or platforms of different weights and/or for making up for leakage or inadvertent discharge of fluid from the circuit. Used in adjusting the pressure are two-position, solenoid-operated, float pressure increase and decrease valves 172 and 173, respectively. The valve 172 has pump and sump ports 174 and 175, respectively, coupled to the pump 92 and sump 94 by the branched conduits 96 and 99, and has a connecting port 176 coupled in fluid communication with a connecting port 177 of the float pressure decrease valve 173 by a connecting conduit 178. The float pressure decrease valve 173 has a control port 179 coupled to the branched conduit 169 so as to be in fluid communication with the accumulator 168. The float pressure increase and decrease valves 172 and 173 are illustrated in respective "off" positions, as shown, to which they are biased by their respective springs 180 and 181 in the absence of power being connected to their respective solenoids 182 and 183. When in their respective "off" positions, pressure fluid delivered by the pump 92 is blocked at the pump port 174 of the float pressure increase valve 172 while pressure fluid, as established by the accumulator 168, is prevented from flowing to the sump 94 by a check valve 184 contained in the float pressure decrease valve 173. Energization of the solenoid 182 of the float pressure increase valve 172 results in the valve shifting to its "increase" position wherein the pump 92 is connected to the connecting conduit 178, by way of the pump port 174 and connecting port 176, with fluid pressure in the connecting conduit 178 unseating the check valve 184 so as to permit fluid to flow to the accumulator 168 by way of the branched conduit 169. On the other hand, energization of the solenoid 183 of the float pressure decrease valve 173 will result in the valve 173 shifting to its "decrease" position wherein it connects the accumulator 168 to the sump 94 by way of the branched conduit 169, connecting conduit 178 and branched return conduit 99.

A float pressure control switch 186, preferably in the form of a rocker switch, is provided for selectively actuating the solenoids of the float pressure increase and decrease valves 172 and 173, respectively, and for that purpose includes a switching element 188 connected to the power lead 116 and normally located in an "off" position between an "increase" contact 190, connected, as by an "increase" lead 192, to the solenoid 182 of the float pressure increase valve 172, and a "decrease" contact 194 connected, as by a "decrease" lead 196, to the solenoid 183 of the float pressure decrease valve 173. Because the pump 92 supplies the pressure fluid for increasing the float pressure, a lead 197 is connected between the "increase" lead 192 and the lead 127 connected between the "lift" lead 122 and the solenoid 113 of the valve 111. Thus, when the "increase" lead 192 is energized, the solenoid 113 is energized to shift the valve 111 to establish the working condition in the pump 92. Diodes 198 and 199, respectively, are provided in the leads 127 and 197 for preventing current from flowing from the "increase" lead 192 to the "lift" lead 122 and vice-versa.

An operator is kept informed of the fluid pressure contained in the float circuit by a pressure monitoring and display circuit. Specifically, a pressure transducer 200 is coupled to the branched conduit 169, the transducer 200 being of any known type which produces an electrical output representative of the sensed pressure. A programmable microprocessor 201, preferably contained in a tachometer of a known design having capabilities for monitoring various vehicle and equipment functions, has an input port 202 connected, as by a lead 204 to receive the electrical output signal from the pressure transducer 200. This signal is processed by the microprocessor and a visual indication of the sensed pressure is displayed at a control panel located in the vehicle cab 26.

Operating the windrower 10 when the float pressure is too low to adequately counterbalance the weight of the header or platform 30 can result in premature wear on the skid shoes 39 and/or in mechanical damage to the header or to the suspension components linking the header to the traction unit. Accordingly, it is desirable to warn the operator of the presence of such an unacceptably low-pressure condition so that the operator can actuate the float pressure control switch 186 to increase the float pressure or to have the pressure automatically increased with or without warning the operator of the existence of the condition. The disclosed control system both warns the operator and automatically increases the pressure to a desired amount if an undesirable low pressure condition exists.

Specifically, the microprocessor 201 is preferably embodied in a tachometer of a known design adapted to be programmed, from the face of a display panel at the operator's station, to contain a minimum pressure setting reflective of the weight of the particular header or platform being used. A branched warning device lead 206 is connected between the power lead 116 and a coil 207 and a switching element 208 of a pressure-increase relay switch 209, the switching element 208 normally being in an "off" position, as illustrated, and being moved, upon energization of the coil 207, into engagement with a contact 210 coupled, as by a lead 212, to the pressure increase lead 192. Connected in the lead 206 in parallel with an input end of the coil 207 and in parallel with each other are an audible warning device 213, which may be a horn or buzzer, and a light 214, the lead 206 and output end of the coil 207 ending at an input port 215 of the microprocessor 201. Internally of the microprocessor 201, the port 215 is connected to a normally open electronic switch 216, which in turn is connected to a grounded output port 217.

The electronic switch 216 is actuated to complete a circuit to ground in response to receiving a signal indicative of a situation where the sensed float pressure is below the preset minimum pressure. In order to suppress this signal in situations where the sensed pressure falls below the preset minimum pressure as a result of the platform being supported free of the ground by the lift cylinder 58, a "lower" sensing lead 218 is connected between the "lower" lead 126 and a "lower" signal input port 220 of the microprocessor 201, the port 220 being connected internally of the microprocessor 201 to a timer 222 that, in turn, is coupled to the electronic switch 216. When the "lower" signal lead 126 is energized and the sensed float pressure is below the preset minimum pressure, the timer 222 is started, the latter being selected so as to time out in about ten seconds. This time delay has been found adequate to allow the platform 30 to reach the ground (less than two seconds with the disclosed float suspension linkage) and the pressure to stabilize after the lift control switch 114 has been actuated to connect the switching element 115 to the "lower" signal lead 126. A further benefit of the time delay is that, during field operation, sensed pressures of short duration are ignored. If the monitored conditions are unchanged at the end of the timed cycle, a signal is emitted closing the electronic switch 216, thus completing a circuit through the lead 206 and causing the audible warning device 213 to sound and the light 214 to be lit.

It will be appreciated that at the same time that the circuit is completed through the warning devices 213 and 214, the coil 207 of the relay 209 will be energized to close the switching element 208 so as to establish a current path to the solenoid 182 of the "increase" valve 172 and to the solenoid 113 of the valve 111. This then results in the pump 92 supplying pressure fluid to the float circuit by way of the valve 172. When the pressure in the float pressure circuit increases to a value equal to or above the preset minimum pressure programmed into the microprocessor 201, the signal received by the microprocessor 201 from the transducer 200 will reflect this fact and result in the electronic switch 216 opening to effect the shutting off of the audible warning device 213 and light 216 and the de-energization of the coil 207 so that the switching element 208 of the relay switch 209 returns to its "off" position. The solenoid-operated pump output control valve 111 and float pressure increase valve 172 will then be de-energized, resulting in the output of the pump 92 being directed to the sump 94 to establish the standby condition in the pump simultaneously with the output of the pump being blocked from fluid communication with the float pressure circuit.

For various reasons it may not be desired that pressure be increased automatically. For example, it may be preferred that an operator be given the opportunity to check the float circuit for defects, such as leaks, once a low pressure warning is received before routing fluid to increase the pressure. The circuit 82 can be modified to permit such operation by merely removing the relay switch 209 from the circuit. The operator would then manually operate the pressure control switch 186 to add pressure if desired.

Figure 3:
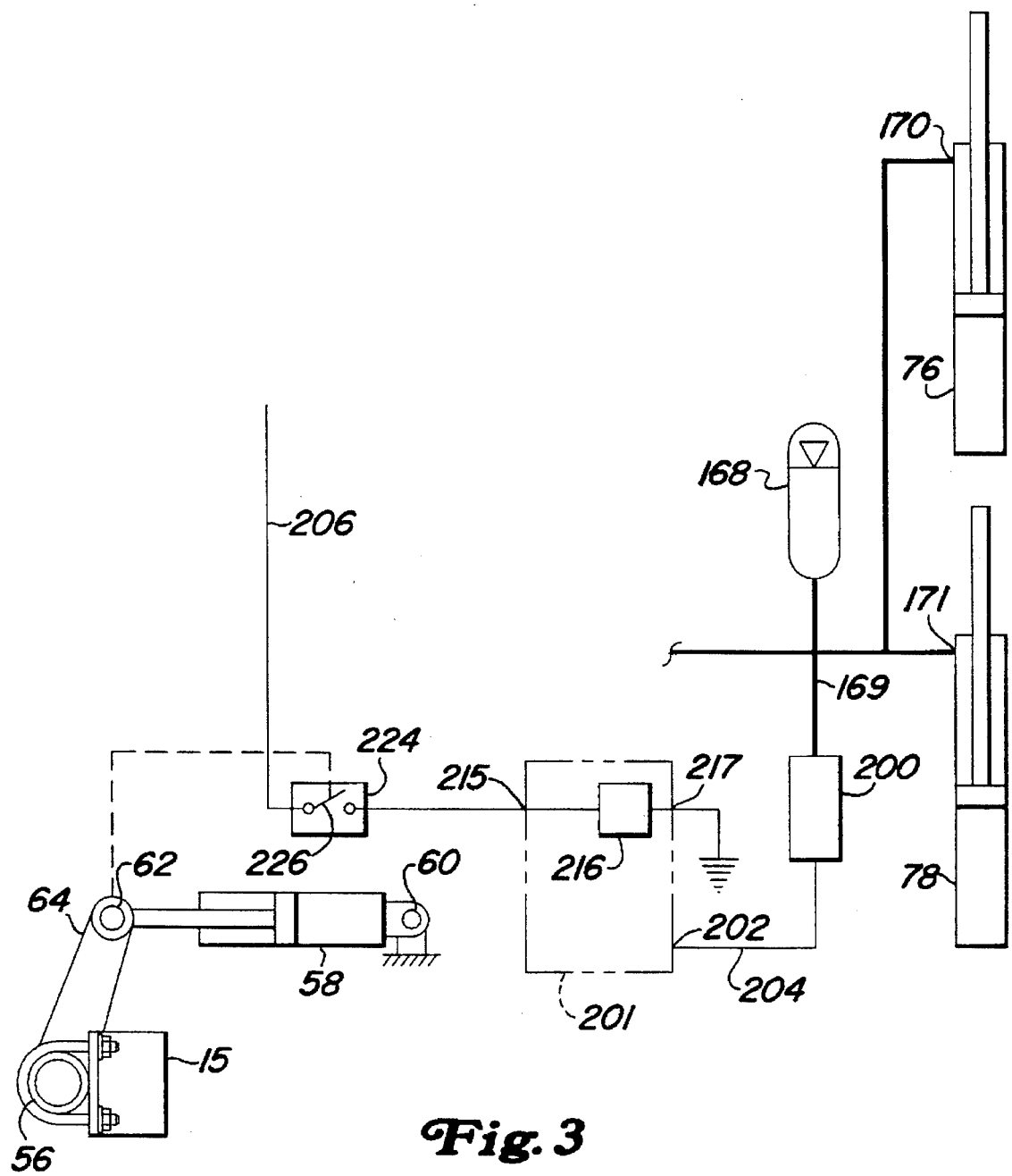
FIG. 3 shows a variation of a portion of the control system shown in FIG. 2 showing a switch actuated by the header suspension linkage for sending a signal to the microprocessor whenever the header is in an operating position.

Further, if desired, the timer 222 and "lower" signal sensing lead 218 could be omitted with sensing of the header condition being done with a normally open header position sensing switch 224 (see FIG. 3) located in the warning device power lead 206 that is connected to the input port 215 of the microprocessor 201. The switch 224 has a switching element 226 located for being engaged and moved to its closed position by a component of the suspension linkage, here shown as the rockshaft input arm 64, at a position in its movement corresponding to the header 30 being located in a working position. The microprocessor 201 would then operate to compare the sensed float pressure with the minimum pressure setting pre-programmed into the microprocessor and to close the electronic switch 216 only in the event the sensed pressure is below the programmed minimum pressure setting and the header position-sensing switch 226 is closed, the warning devices 213 and 214 then, and only then, being energized.

In any event, completion of the circuit through the lead 206 establishes, by way of the relay switch 209, an alternate route for current to pass to the "increase" signal lead 192 resulting in the energization of the solenoid 182 of the increase valve 172 causing the latter to shift to connect the pump 92 to the float pressure circuit conduit 169. The pressure in the float circuit will then increase until such time that the pressure sensed by the transducer 200 results in a signal being sent to the microprocessor which is representative of a pressure equal to or greater than the preselected minimum pressure setting programmed into the microprocessor 201. The electronic switch 216 will then be caused to open in response to this new pressure so as to discontinue the flow of electrical current through the lead 206 and, hence, to the "increase" signal lead 192 by way of the relay switch 209. This being the case, the "increase" valve solenoid 182 will become de-energized resulting in the valve 172 shifting back to its "off" position.

If desired, the relay switch 209 could be omitted, in which case, the operator, having noticed the energization of the warning devices 213 and 214, would operate the float pressure control switch 186 to effect actuation of the "increase" valve solenoid 182, the operator holding the switch 186 in place until the warning devices 213 and 214 are no longer energized which indicates that the float pressure has been increased to a value equal to or greater than the preset minimum value.

What is claimed is:

1. In combination with an agricultural implement including a crop processing header suspended from a main frame of the implement for movement between a raised transport position and a lowered working condition by a float suspension including at least one single-acting float cylinder coupled to a accumulator in a closed hydraulic float pressure circuit, an electrohydraulic float pressure control valve means coupled to a source of fluid pressure and a sump and to said float pressure circuit and being responsive to electrical "increase" and "decrease" signals for respectively coupling the pump to the float pressure circuit for increasing the fluid pressure therein, and for coupling the sump to the float pressure circuit for decreasing the fluid pressure therein, an electrohydraulic control system for apprising an operator of the fact that float pressure in said float pressure circuit is below a minimum acceptable operating pressure, comprising: a programmable microprocessor including signal storing means for storing a preset electrical signal representative of a minimum acceptable float pressure and including a normally open electronic switch coupled to a grounded output; a warning signal control lead containing at least one warning device and being coupled between a source of electrical power and a first microprocessor input port connected to said electronic switch, with said warning device being energized only when said electronic switch is closed; a float pressure transducer means coupled between said float circuit and a second input port of said microprocessor and being operative for producing, and conveying to said microprocessor, an electrical signal representative of said float circuit pressure; a header position monitoring means coupled to said electronic switch; and said microprocessor including signal processing means coupled for effecting closure of said electronic switch only when said float pressure transducer produces an electrical signal representative of a pressure below said preset minimum acceptable pressure, and when said header position signal means produces an electrical header position signal indicating said header is in its working condition.

2. The combination defined in claim I wherein a manually operable float pressure control switch means is coupled between the source of electrical power and said float circuit pressure control valve means for selectively coupling said "increase" and "decrease" signals to said float pressure valve means, whereby an operator may operate said float pressure control switch means for increasing the float pressure to a new pressure value equal to or above said acceptable minimum float pressure thereby resulting in the electrical signal from said transducer changing to a value representative of said new pressure value so as to result in the microprocessor turning off its electronic switch thereby resulting in the warning device being shut off.

3. The combination defined in claim 1 wherein a normally open relay switch means is located in a lead extending between said microprocessor grounded output and said electrohydraulic float pressure control valve means for being energized and closed for establishing a circuit conveying said "increase" signal to said electrohydraulic float pressure control valve means when said warning device is actuated, the float pressure control valve means coupling said pump to said float pressure circuit to cause its pressure to increase to a value equal to or above said acceptable minimum operating pressure whereupon the electrical signal received from said transducer will result in said electronic switch opening to de-energize said warning device and said relay switch means.

4. The combination defined in claim 1 wherein said header suspension includes at least one single-acting lift cylinder; electrohydraulic lift control valve means coupled to said pump and sump and to said lift cylinder and being operable, in response to receiving a "raise" electrical signal, to couple said pump to said lift cylinder to effect lifting of said header, and being responsive to receiving a "lower" electrical signal to couple said sump to said lift cylinder to permit lowering of said header under gravitational influence; manually operable lift control switch means coupled between said source of electrical power and said electrohydraulic lift control valve means for selectively coupling said "raise" and "lower" electrical signals to said lift control valve means; said microprocessor including a time delay means forming part of said position monitoring means and being connected for receiving said "lower" electrical signal for beginning a timing sequence having a duration at least long enough for permitting said header to move from its transport to its working position once said manually operable switch means is actuated for connecting said "lower" signal to said electrohydraulic lift control valve; and said time delay means being operable for suppressing said electrical signal representative of said float pressure so as to prevent closing of said electronic switch until a sensed float pressure has remained below said acceptable minimum float pressure for an entire timing sequence, whereby premature operation of said warning device is prevented.

5. The combination defined in claim 1 wherein said header suspension means includes at least one single-acting hydraulic lift cylinder; electrohydraulic lift control valve means coupled to said pump and sump and to said lift cylinder and being operable, in response to receiving a "raise" electrical signal, to couple said pump to said lift cylinder to effect lifting of said header, and being responsive to receiving a "lower" electrical signal to couple said sump to said lift cylinder to permit lowering of said header under gravitational influence; manually operable lift control switch means coupled in said warning signal control lead between said at least one warning device and said electrohydraulic lift control valve means for selectively coupling said "raise" and "lower" electrical signals to said lift control valve means; a "lower" signal lead coupled between said manually operable lift control switch means and said microprocessor; and a normally open header position responsive switch coupled in said warning signal control lead in series with said electronic switch, whereby current flow to said at least one warning device will occur only when said header is in said operating position and said electronic switch is closed.

6. In a combination with an agricultural implement having a main frame, a header, a suspension coupling said header to said main frame for movement between transport and working positions and including at least one single-acting float cylinder coupled in a float pressure circuit including an accumulator, an electrohydraulic float pressure control valve means connected between said float pressure circuit and a sump and pump and being responsive to an electrical "increase" signal for connecting said pump to said float pressure circuit for increasing float pressure in said circuit and being responsive to an electrical "decrease" signal for connecting said sump to said float pressure circuit for decreasing float pressure in said circuit, said suspension including at least one hydraulic lift cylinder for effecting movement of said header between said transport and working positions, and an electrohydraulic lift cylinder control valve means connected between said lift cylinder and said sump and pump and being responsive to an electrical "raise" signal for moving said header to said transport position, and being responsive to an electrical "lower" signal for moving said header to said working position, a low pressure warning system for apprising an operator of the existence of an unacceptably low working pressure in said float pressure circuit, comprising: a source of electrical power; a warning device connected in a warning device lead coupled to said source of electrical power; a normally open electronically controlled grounding switch means connected in said warning device lead between said warning device and a ground connection; said grounding switch being responsive for coupling said warning device lead to ground only when receiving an electrical float pressure signal representative of an unacceptable low float pressure for adequately supporting the header in its working position together with an electrical header position signal representative of said header being in its working position; and electrical control means for said electronic switch including a float pressure sensing means for providing said electrical float pressure signal and including a header position indicating means for providing said electrical header position signal, whereby the existence of an unacceptable float pressure while the header is in its working position will result in the energization of said warning device.

7. The combination defined in claim 6 wherein a relay switch is connected to said warning device lead at a location between said electronic switch and said ground connection, and is connected to said float pressure control valve means so as to provide the latter with said pressure "increase" electrical signal simultaneously with the energization of said warning device, whereby said float pressure control valve means will couple said pump to said float pressure circuit to automatically effect an increase in the circuit pressure.

* * * * *